United States Patent

Yamakoshi et al.

[11] Patent Number: 5,961,187
[45] Date of Patent: Oct. 5, 1999

[54] LOAD RESPONSE TYPE BRAKE FLUID PRESSURE CONTROLLER

[75] Inventors: Mutsuro Yamakoshi; Kimio Ishihara, both of Higashimatsuyama, Japan

[73] Assignee: Jidosha Kiki Co., Ltd., Japan

[21] Appl. No.: 08/944,742

[22] Filed: Oct. 6, 1997

[30]   Foreign Application Priority Data

Oct. 25, 1996   [JP]   Japan ..................................... 8-283545

[51] Int. Cl.$^6$ ....................................................... B60T 8/18
[52] U.S. Cl. ........................................ 303/22.1; 303/9.69
[58] Field of Search ................................ 303/9.69, 22.1, 303/22.2

[56]          References Cited

U.S. PATENT DOCUMENTS

| | | | |
|---|---|---|---|
| 3,503,657 | 3/1970 | MacDuff | 303/9.69 |
| 3,701,616 | 10/1972 | Kawai | 303/22.1 |
| 4,623,200 | 11/1986 | Ando et al. | 303/22.1 |
| 4,925,277 | 5/1990 | Picot et al. | 303/22.1 |
| 5,246,277 | 9/1993 | Yamakoshi | 303/9.69 |
| 5,302,006 | 4/1994 | Castel | 303/9.69 |

*Primary Examiner*—Robert J. Oberleitner
*Assistant Examiner*—Robert A. Siconolfi
*Attorney, Agent, or Firm*—Trop, Pruner, Hu & Miles, P.C.

[57]           ABSTRACT

An equalizer 26 is interposed between a load detecting lever 22 and one end of each plunger 3, 4, a clamp member 23 is provided to position the equalizer at a predetermined position of the load detecting lever 22, a connecting portion rotatably connected to a housing 2 concentrically with respect to a support portion 2*a* supporting the load detecting lever 22 is provided on the clamp member, an arm 24 is formed at the connecting portion of the clamp member 23, and the arm 24 is supported by the support portion 2*a* of the housing 2 by using a pin 27 common to the load detecting lever 22.

2 Claims, 4 Drawing Sheets

LOAD RESPONSE TYPE BRAKE FLUID PRESSURE CONTROLLER

FIELD OF THE INVENTION AND RELATED ART STATEMENT

The present invention relates to a load response type brake fluid pressure controller for controlling a brake pressure by decreasing the output liquid pressure of a master cylinder on a vehicle at a predetermined ratio corresponding to the movable load.

FIG. 7 is a sectional view of a conventional load response type brake fluid pressure controller, and FIG. 8 is a partially broken front view showing the principal portion of the controller. This load response type brake fluid pressure controller 1 has a valve mechanism in a housing 2 fixed to the chassis side of a vehicle. A pair of plungers 3 and 4, which are actuated independently in response to the liquid pressure from a master cylinder (not shown), are disposed slidably in a liquid tight manner, and the holes of valve seats 5 and 6 formed in the housing 2 are opened and closed by the movement of valve elements 3b and 4b integral with the paired plungers 3 and 4. By the opening/closing action of the valve elements 3b and 4b, the pressure of a liquid transmitted independently from the master cylinder to inlet ports 7 and 8 is decreased at a predetermined ratio, and the liquid is transmitted to the right and left rear wheel brake cylinders through outlet ports 9 and 10.

The housing 2 is provided with a load detecting mechanism 11. The load detecting mechanism 11 is composed of a spring 12, load detecting lever 13, equalizer 14, and cramp member 15. The spring 12 is connected to a rear axle member 16 at one end and to the tip end of the load detecting lever 13 at the other end, so that the urging force corresponding to the movable load of the vehicle is transmitted to the load detecting lever 13.

The load detecting lever 13 is rotatably supported by a support portion 2a of the housing 2 through a pin 17 and a bush 18 at the base end, so that the urging force of the spring 12 is applied to protruding ends 3a and 4a of the paired plungers 3 and 4 disposed in the housing 2 via the equalizer 14. Also, a concave 13a is provided on the upper face of the load detecting lever 13 to position the cramp member 15 at a predetermined position.

The clamp member 15 is mounted on the load detecting lever 13 inserted in a through hole 15a in the center, and has hook portions 15b provided at both ends in the direction perpendicular to the load detecting lever 13 and a central downward protrusion 15c. By fitting the protrusion 15c in the concave 13a, the clamp member 15 is positioned with respect to the load detecting lever 13, and the equalizer 14 is hooked by the hook portions 15b. The protruding ends 3a and 4a of the plunger 3 and 4, the equalizer 14, etc. are covered with a boot 19 to protect these elements from the entrance of foreign matters.

OBJECT AND SUMMARY OF THE INVENTION

However, the above-described conventional brake fluid pressure controller has disadvantages that when the clamp member 15 is subjected to an external force along the lengthwise direction of the load detecting lever 13, the equalizer is positioned incompletely, the lever ratio fluctuates, a proper urging force of the spring 12 is not transmitted, and there is a possibility of fluctuating brake fluid pressure characteristics.

The present invention was made in view of the above-mentioned disadvantages, and accordingly an object thereof is to provide a load response type brake fluid pressure controller in which even if a clamp member is subjected to an external force along the lengthwise direction of a load detecting lever, an equalizer is positioned reliably, the lever ratio does not fluctuate, a proper urging force of a spring is transmitted, and the brake fluid pressure characteristics do not fluctuate.

To achieve the above object, the present invention provides a load response type brake fluid pressure controller comprising a valve mechanism which decreases the pressure of a liquid from a brake master cylinder at a predetermined ratio by a pair of plungers actuated independently in response to the liquid pressure from the brake master cylinder and transmits the pressure to right and left rear wheel brake cylinders, and a load detecting mechanism which applies a load corresponding to the movable load of a vehicle to the plungers and moves the pressure decreasing action start point of the valve mechanism, the load detecting mechanism being provided with a load detecting lever rotatably supported by the support portion of a housing of the valve mechanism at the base end and a spring which is connected to the tip end side of the load detecting lever at one end and to the axle side at the other end, and a spring which provides an urging force corresponding to the movable load of the vehicle to the load detecting lever, The brake fluid pressure controller comprising an equalizer interposed between the load detecting lever and one end of each of the plungers and a clamp member for positioning the equalizer at a predetermined position of the load detecting lever, the clamp member being provided with a connecting portion rotatably connected to the housing concentrically with respect to a support portion for supporting the load detecting lever.

According to the present invention, the brake fluid pressure controller comprises an equalizer interposed between the load detecting lever and one end of each of the plungers and a clamp member for positioning the equalizer at a predetermined position of the load detecting lever, and the clamp member is provided with a connecting portion rotatably connected to the housing concentrically with respect to a support portion for supporting the load detecting lever. Therefore, the present invention achieves the following effects: the equalizer rotates concentrically with the load detecting lever and is not misaligned, the equalizer is positioned reliably, the lever ratio does not fluctuate, a proper urging force of a spring is transmitted, and the brake fluid pressure characteristics do not fluctuate. Also, an arm is formed at the connecting portion of the clamp member, and the arm is supported by the support portion of the housing by using a pin common to the lever detecting lever, so that the clamp member and the equalizer, which is positioned by the clamp member, move around the common pin integrally with the load detecting lever. Therefore, even if the clamp member is subjected to an external force along the lengthwise direction of the load detecting lever, the equalizer is positioned reliably, and the lever ratio does not fluctuate.

DETAILED DESCRIPTION OF PREFERRED EMBODIMENTS

Figure 1:
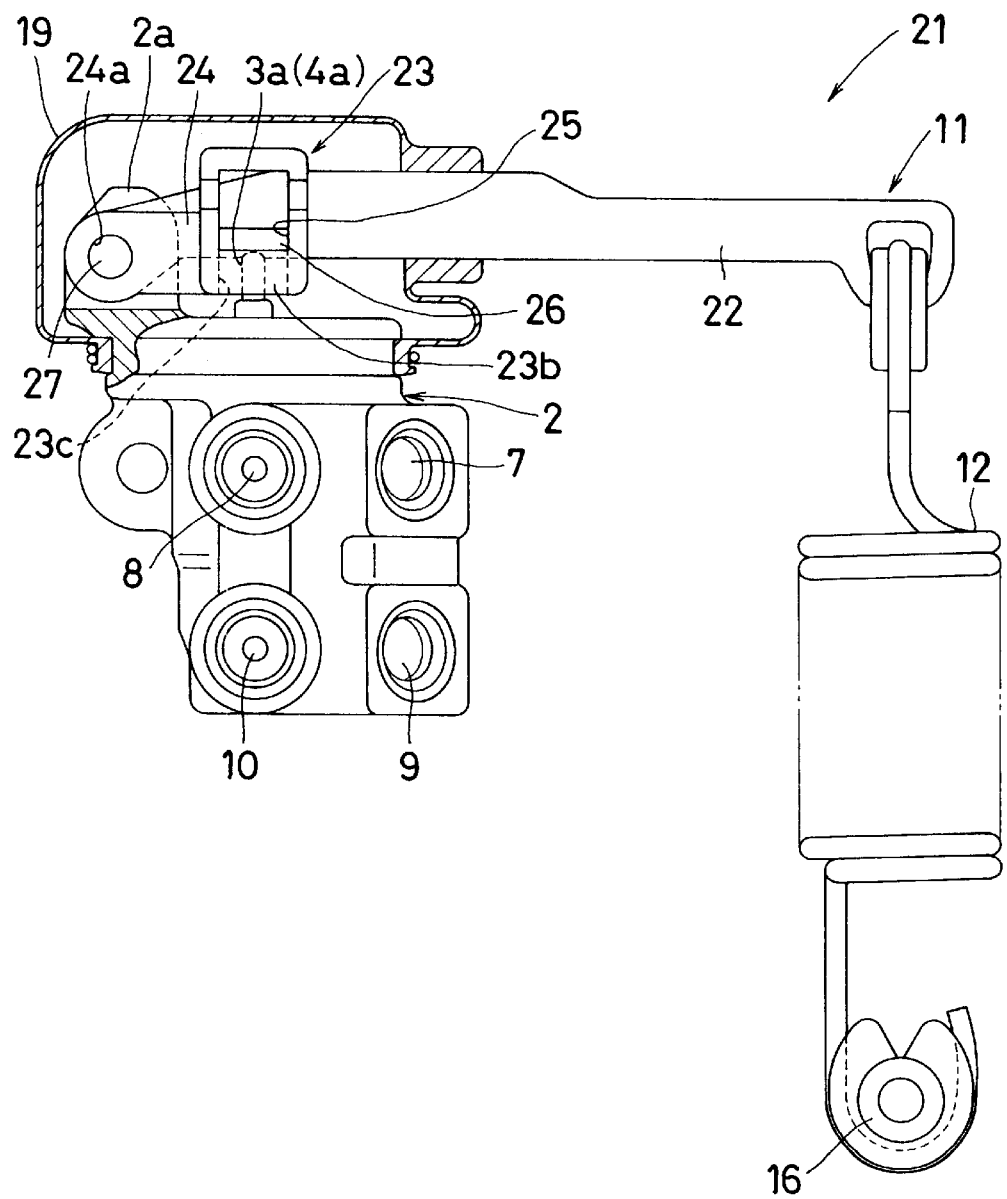
FIG. 1 is a partially broken front view showing a principal portion of a load response type brake fluid pressure controller in accordance with an embodiment of the present invention.
Figure 2:
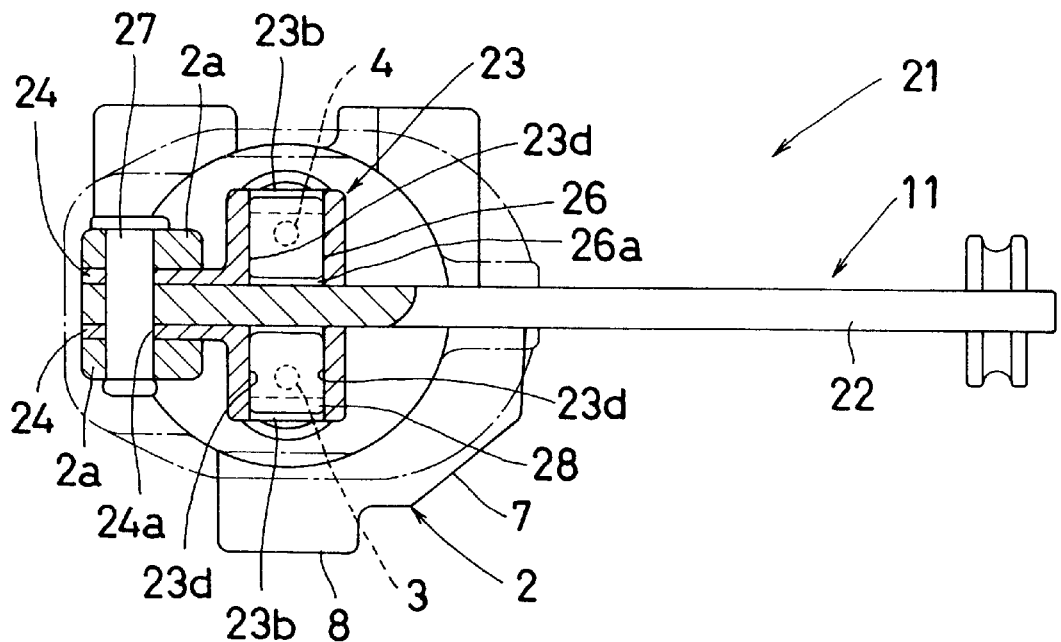
FIG. 2 is a partially broken plan view showing the principal portion shown in FIG. 1, some part being omitted.

A load response type brake fluid pressure controller in accordance with an embodiment of the present invention will be described in detail with reference to the accompanying drawings. FIG. 1 is a partially broken front view of a load response type brake fluid pressure controller in accordance with an embodiment of the present invention, and FIG. 2 is a partially broken plan view of the controller shown in FIG. 1, some part being omitted. The same reference numerals are applied to the same elements as those of the conventional controller, and the duplicate explanation of these elements is omitted as far as possible.

This load response type brake fluid pressure controller 21 has a valve mechanism, which is the same as that of the conventional controller, in a housing 2, includes a load detecting lever 22 constituting a load detecting mechanism 11 and a clamp member 23 which is rotatable together with the load detecting lever 22. An equalizer 26, which is interposed between the load detecting lever 22 and protruding ends 3a and 4a (indicated by two-dot chain lines in FIG. 6) of plungers 3 and 4 of the valve mechanism, is positioned at a predetermined position of the load detecting lever 22 by the clamp member 23.

The brake fluid pressure controller 21 is provided with a connecting portion for connecting the clamp member 23 to the housing 2 in such a manner as to be concentrically rotatable with respect to a support portion 2a of the housing 2 for supporting the load detecting lever 22, and an arm 24 engaging with a common pin 27 for supporting the load detecting lever 22 is formed at this connecting portion. Thereby, the clamp member 23 is not misaligned with respect to the load detecting lever 22, the equalizer 26 is positioned reliably, the lever ratio does not fluctuate, a proper urging force of the spring 12 is transmitted, and the brake fluid pressure characteristics do not fluctuate.

Like the conventional controller, the valve mechanism is designed so that a pair of plungers 3 and 4 (see FIG. 6), which are actuated independently in response to the liquid pressure from a master cylinder, are disposed slidably in a liquid tight manner, and the holes of valve seats formed in the housing 2 are opened and closed by the movement of valve elements integral with the paired plungers 3 and 4. Also, the valve mechanism is designed so that the housing 2 is attached to a frame etc. of the vehicle, inlet ports 7 and 8 are connected to the master cylinder, and outlet ports 9 and 10 are connected to the wheel cylinder.

Like the conventional controller, the valve mechanism decreases the pressure of a liquid transmitted independently from the master cylinder to the inlet ports 7 and 8 at a predetermined ratio by the opening/closing action of the valve elements, and transmits the liquid to the right and left rear wheel brake cylinders through the outlet ports 9 and 10.

The load detecting lever 22 is rotatably supported by a support portion 2a of the housing 2 through the pin 27 at the base end, so that the urging force of the spring 12 is applied to the protruding ends 3a and 4a of the paired plungers 3 and 4 disposed in the housing 2 via the equalizer 26.

Figure 3:
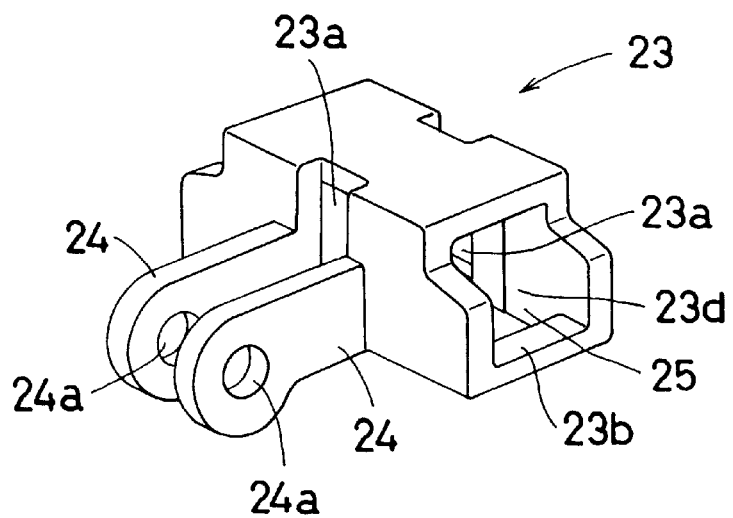
FIG. 3 is a perspective view of a clamp member in accordance with the embodiment of the present invention.
Figure 4:
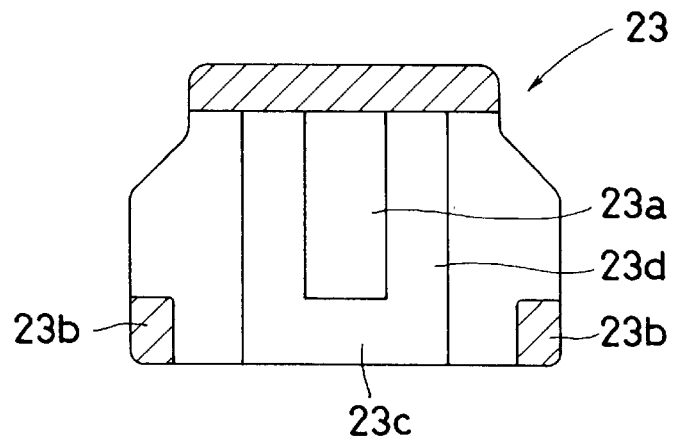
FIG. 4 is a side sectional view of a clamp member in accordance with the embodiment of the present invention.

FIG. 3 is a perspective view of the clamp member, and FIG. 4 is a side sectional view of the clamp member. The clamp member 23 has a pair of arms 24, 24 formed integrally, which are arranged along the outer faces at both sides of the load detecting lever 22, and is connected to the support portion 2a of the housing 2 in such a manner as to be rotatable with the pin 27. Also, the clamp member 23 is supported by the load detecting lever 22 inserted in a through hole 23a substantially in the center, positioned with respect to the load detecting lever 22, and is capable of rotating together with the load detecting lever 22.

Further, the clamp member 23 has hook portions 23b provided at both ends in the direction perpendicular to the load detecting lever 22, and an opening 23c at the bottom. A space 25 along the direction perpendicular to the load detecting lever 22 is formed between parallel inner faces 23d, 23d having a gap slightly spread at a position away from the through hole 23a. The equalizer 26 inserted in this space 25 is positioned in the lengthwise direction of the lever 22 by the parallel inner faces 23d and the arm 24.

Figure 5:
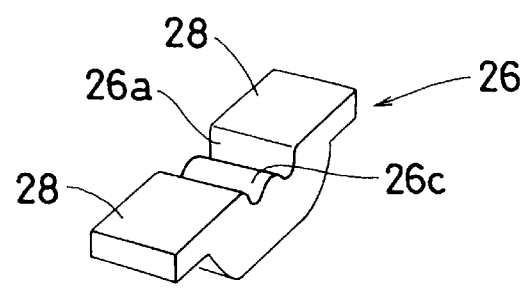
FIG. 5 is a perspective view of an equalizer in accordance with the embodiment of the present invention.
Figure 6:
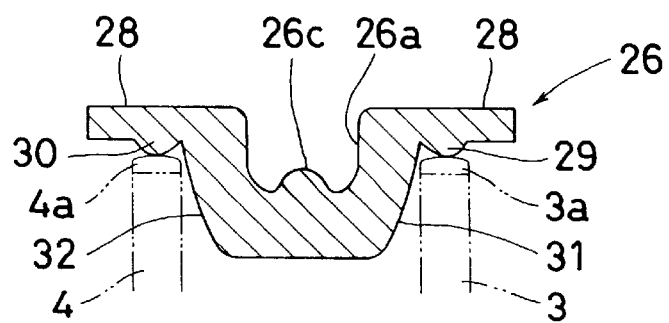
FIG. 6 is a longitudinal sectional view at the position passing through the center of FIG. 5.
Figure 7:
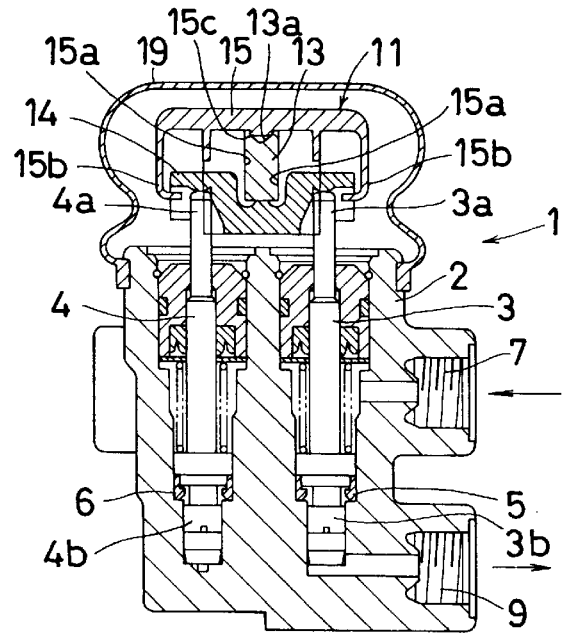
FIG. 7 is a sectional view of a conventional load response type brake fluid pressure controller.
Figure 8:
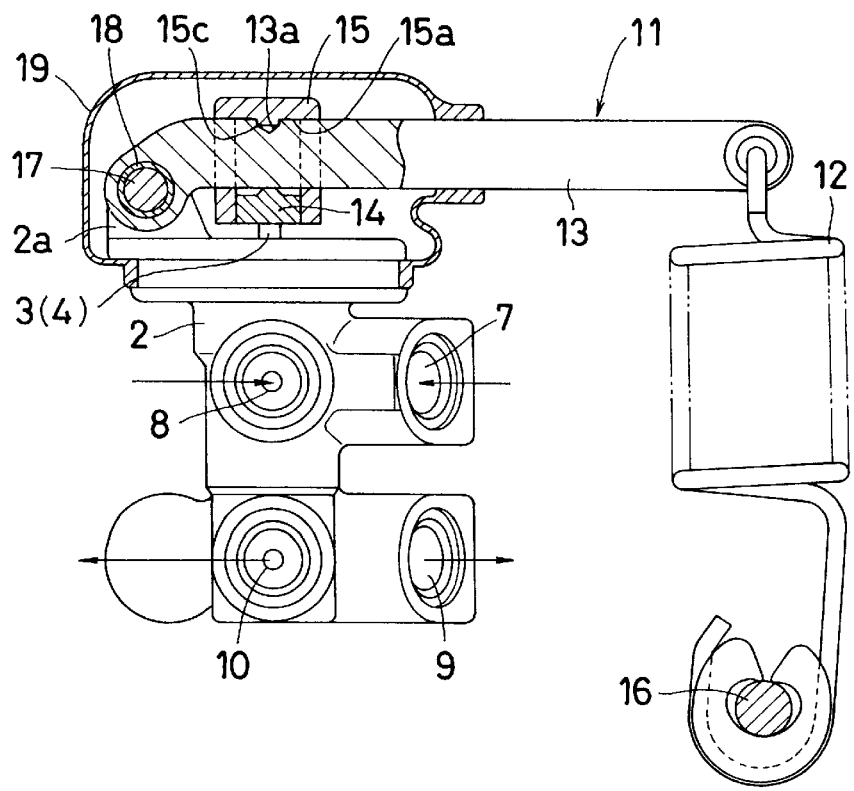
FIG. 8 is a partially broken front view showing a principal portion of the conventional load response type brake fluid pressure controller.

FIG. 5 is a perspective view of the equalizer, and FIG. 6 is a longitudinal sectional view at the position passing through the center of FIG. 5. The equalizer 26 has a straight groove portion 26a at the central portion. An upward protrusion 26c is formed at the bottom of the groove portion 26a, and protrusions 29 and 30, which are in contact with the protruding ends 3a and 4a of the paired plungers 3 and 4, are formed at the back face of the extending portions 28 extending to both sides. When the equalizer 26 is far away upward from the plungers 3 and 4, the extending portions 28 are hooked by the hook portions 23b of the clamp member 23, and the load detecting lever 22 passes through the groove portion 26a.

The equalizer 26 has guides 31 and 32 consisting of a tapered face or curved face, which are formed on both sides of the back face of the central portion. When a load from the lever 22 is transmitted to the plungers 3 and 4 via the equalizer 26, the paired plungers 3 and 4 are reliably guided to the protrusions 29 and 30 by the guides 31 and 32.

When the equalizer 26 is mounted to the load detecting lever 22, the equalizer 26 is inserted into the space 25 of the clamp member 23, the load detecting lever 22 is inserted into the through hole 23a and the groove portion 26a, is arranged at a predetermined position of the support portion 2a by aligning the base end of the load detecting lever 22 with the arm 24, and the common pin 27 is inserted into the hole of the support portion 2a, the connecting hole of the arm 24, and the hole of the load detecting lever 22 to connect the clamp member 23 to the support portion 2a of the housing 2.

Thereupon, the equalizer 26 is positioned at a constant lever ratio, the lever ratio does not fluctuate, a proper urging force of the spring 12 is transmitted to each plunger 3, 4, and the fluctuation in the brake fluid pressure characteristics can be prevented. The lever ratio can be changed easily by preparing various clamp members 23 in which only the length of the arm 24 is different and by changing the length of the arm 24.

According to the load response type brake fluid pressure controller 21 in accordance with the above embodiment of the present invention, the equalizer 26 is positioned only by installing the arm 24 to the clamp member 23, the lever ratio does not fluctuate, and a proper urging force of the spring 12 is transmitted to each plunger 3, 4. The equalizer 26 can be assembled together with the lever detecting lever 22, so that the assembling property is high. The concave of the load detecting lever 22 is unnecessary, so that the machining of hole is not required, resulting in a low cost.

The present invention is not limited to the above embodiment, but can be modified variously without departing from the spirit and scope of the invention.

We claim:

1. A load response type brake fluid pressure controller comprising:

a valve mechanism which decreases the pressure of a liquid from a brake master cylinder at a predetermined ratio by a pair of plungers actuated independently in response to the liquid pressure from said brake master cylinder and transmits the pressure to right and left rear wheel brake cylinders, a housing including a support portion, and a load detecting mechanism which applies a load corresponding to the movable load of the vehicle to said plungers and moves the pressure decreasing action start point of said valve mechanism, said housing including a base end, an other end, a tip end side, and an axle side, said load detecting mechanism being provided with a load detecting lever rotatably supported by the support portion of said housing of said valve mechanism at the base end and a spring which is connected to the tip end side of said load detecting lever at one end and to the axle side at the other end, and a spring which provides an urging force corresponding to the movable load of said vehicle to said load detecting lever, said brake fluid pressure controller comprising an equalizer interposed between said load detecting lever and one end of each of said plungers and a clamp member for positioning said equalizer in a predetermined position of said load detecting lever, said clamp member being provided with a connecting portion rotatably connected to said housing concentrically with respect to said support portion for supporting said load detecting lever, said clamp member together with said load detecting lever is rotatable with respect to said housing.

2. A load response type brake fluid pressure controller according to claim (1), wherein an arm is formed at the connecting portion of said clamp member, and said arm is supported by the support portion of said housing by using a pin common to said load detecting lever.

* * * * *